Patented Oct. 19, 1943

2,332,467

UNITED STATES PATENT OFFICE 2,332,467

PRODUCTION OF ETHERS

Carl B. Linn and Vladimir N. Ipatieff, Chicago, Ill., assignors to Universal Oil Products Company, Chicago, Ill., a corporation of Delaware No Drawing. Application August 16, 1941, Serial No. 407,226

9 Claims. (Cl. 260—614)

This invention relates to a process for producing ethers and more particularly for producing mixed ethers utilizable in the production of high quality motor fuels of gasoline boiling range.

In one specific embodiment the present invention comprises a process for producing ethers which includes contacting an alcohol and an alkyl halide with zinc at a temperature of from about 75° to about 150° C.

The preparation of ethers by the catalytic interaction of olefins and alcohols has been known for some time but this prior art process is limited to the use of tertiary olefins such as isobutene, trimethylethylene, etc. Further, it has not been possible to similarly prepare ethers by the interaction of alcohols with non-tertiary olefins such as propene and the normal butenes.

The present invention differs from the prior art in that an alkyl halide rather than an olefin is subjected to reaction with an alcohol, particularly a primary or secondary aliphatic alcohol, in the presence of a metal such as zinc. Thus it is possible to utilize non-tertiary olefins by first treating them with a hydrogen halide to produce alkyl halides utilizable in the present process for producing ethers such as isopropyl ether, ethyl ether, di-isopropyl ether, secondary butyl isopropyl ether, etc., by reaction of the appropriate alcohols and alkyl halides in the presence of zinc to which may be added anhydrous zinc chloride. Alkyl chlorides, being generally the most readily available and cheapest of the alkyl halides, may therefore be used to the best advantage in the present process but in certain cases other alkyl halides selected from the fluorides, bromides, and iodides may also be employed in effecting the desired ether formation. The different alkyl halides which may thus be employed in the process are not necessarily equivalent in their action and the conditions of operation are dependent upon the reactivity of the alkyl halide and also of the alcohol undergoing reaction. An advantage of this method of ether formation is that mixed ethers of relatively high octane numbers may be prepared in relatively high yields. These desirable ethers are not now available from any relatively simple synthesis at a reasonable cost.

The alcohol and alkyl halide may be reacted under a pressure of from substantially atmospheric to approximately 50 atmospheres or more at a temperature between about 75° and about 150° C. in a suitable autoclave or a somewhat higher temperature may be employed when a flow method of contacting is utilized wherein the reactants pass over metallic zinc in a suitable reaction vessel after which the ether so formed is separated from unchanged reactants and the latter are recycled to further contact with the metallic zinc. The zinc employed in the process may also be in finely divided form so that the entire reaction mixture may be passed through a reactor provided with baffles or other mixing devices to effect intimate contact of the liquid reactants with the finely divided zinc.

The following example is given to indicate typical results obtained in the operation of the process, although these data are not presented with the intention of unduly limiting the generally broad scope of the invention.

150 parts by weight of isopropyl chloride, 90 parts by weight of ethyl alcohol, and 100 parts by weight of zinc powder were sealed in a glass-lined autoclave which was then rotated for 3 hours at a temperature of 100° C. After cooling, the products removed from the autoclave yielded 70 parts by weight of isopropyl ethyl ether, 65 parts by weight of unreacted isopropyl chloride (suitable for further treatment with zinc and alcohol), and 10 parts by weight of condensible gases consisting of 65% by volume of propene and 35% of propane.

The character of the process of the present invention and particularly its commercial value are evident from the preceding specification and limited numerical data, although neither section is intended to limit its generally broad scope.

We claim as our invention:

1. A process for producing an ether which comprises reacting an alcohol and an alkyl halide in the presence of metallic zinc at a temperature of from about 75° to about 115° C.

2. A process for producing an aliphatic ether which comprises reacting an aliphatic alcohol and an alkyl halide in the presence of metallic zinc at a temperature of from about 75° to about 150° C.

3. A process for producing an aliphatic ether which comprises reacting an aliphatic alcohol and an alkyl chloride in the presence of metallic zinc at a temperature of from about 75° to about 150° C.

4. A process for producing an aliphatic ether which comprises reacting an aliphatic alcohol and an alkyl chloride in the presence of metallic zinc at a temperature of from about 75° to about 150° C. under a pressure of from substantially atmospheric to approximately 50 atmospheres.

5. A process for producing an aliphatic ether which comprises reacting an aliphatic alcohol and an alkyl chloride in the presence of finely divided metallic zinc at a temperature of from about 75° to about 150° C. under a pressure of from substantially atmospheric to approximately 50 atmospheres.

6. A process for producing a mixed aliphatic ether which comprises contacting metallic zinc at a temperature of from about 75° to about 150° C. with a mixture of an aliphatic alcohol and an alkyl halide having an alkyl group different from that of said alcohol.

7. A process for producing a mixed aliphatic ether which comprises contacting metallic zinc at a temperature of from about 75° to about 150° C. with a mixture of an aliphatic alcohol and an alkyl chloride having an alkyl group different from that of said alcohol.

8. A process for producing a mixed aliphatic ether which comprises contacting metallic zinc at a temperature of from about 75° to about 150° C. with a mixture of an aliphatic alcohol and an alkyl bromide having an alkyl group different from that of said alcohol.

9. A process for producing isopropyl ethyl ether which comprises reacting ethyl alcohol and isopropyl chloride in the presence of finely divided metallic zinc at a temperature of from about 75° to about 150° C. under a pressure of from substantially atmospheric to approximately 50 atmospheres.

CARL B. LINN.
VLADIMIR N. IPATIEFF.

CERTIFICATE OF CORRECTION.

Patent No. 2,332,467. October 19, 1943.

CARL B. LINN, ET AL.

It is hereby certified that error appears in the printed specification of the above numbered patent requiring correction as follows: Page 1, second column, line 37, claim 1, for "115° C." read --150° C.--; and that the said Letters Patent should be read with this correction therein that the same may conform to the record of the case in the Patent Office.

Signed and sealed this 11th day of April, A. D. 1944.

(Seal)

Leslie Frazer

Acting Commissioner of Patents.